US011665424B2

(12) United States Patent
Wada

(10) Patent No.: US 11,665,424 B2
(45) Date of Patent: May 30, 2023

(54) CAMERA-CAPTURED IMAGES TRANSFER DEVICE

(71) Applicant: MEDIAEDGE Corporation, Hyogo (JP)

(72) Inventor: Noriaki Wada, Hyogo (JP)

(73) Assignee: MEDIAEDGE Corporation, Hyogo (JP)

( * ) Notice: Subject to any disclaimer, the term of this patent is extended or adjusted under 35 U.S.C. 154(b) by 23 days.

(21) Appl. No.: 17/618,955

(22) PCT Filed: May 21, 2020

(86) PCT No.: PCT/JP2020/020092
§ 371 (c)(1),
(2) Date: Dec. 14, 2021

(87) PCT Pub. No.: WO2021/014728
PCT Pub. Date: Jan. 28, 2021

(65) Prior Publication Data
US 2022/0272257 A1    Aug. 25, 2022

(30) Foreign Application Priority Data
Jul. 23, 2019  (JP) .............................. JP2019-135033

(51) Int. Cl.
*H04N 23/60*   (2023.01)
*H04N 5/77*    (2006.01)
*H04N 7/10*    (2006.01)

(52) U.S. Cl.
CPC ............. *H04N 23/665* (2023.01); *H04N 5/77* (2013.01); *H04N 7/10* (2013.01)

(58) Field of Classification Search
CPC ........ H04N 23/665; H04N 5/77; H04N 5/247; H04N 5/232; H04N 7/10
See application file for complete search history.

(56) References Cited

U.S. PATENT DOCUMENTS

2011/0317021 A1  12/2011  Takahashi
2012/0098980 A1*  4/2012  Takahashi .............. H04N 23/90
                                                    348/E5.042

FOREIGN PATENT DOCUMENTS

JP    H5-115030 A    5/1993
JP    2000-069322 A  3/2000
(Continued)

OTHER PUBLICATIONS

International Search Report for International Application No. PCT/JP2020/020092, dated Aug. 4, 2020.
(Continued)

*Primary Examiner* — Nelson D. Hernández Hernández
(74) *Attorney, Agent, or Firm* — Jason H. Vick; Sheridan Ross, PC

(57) ABSTRACT

[Problem to be Solved] When a cable length between a CHU and a CCU varies, images-capture timings of the plural CHUs mismatch.

[Solution] In order to match the images-capture timing of the CHU, a phase control circuit in each CCU transfers, to the CHU, a frame pulse signal, a phase of which is advanced by a correction time corresponding to the cable from a time position of beginning of a frame of a reference synchronizing signal input to the CCU. In this way, a timing of the beginning of a frame of a synchronizing signal, which is received by the CHU from a synchronizing signal generation circuit, matches in a case of 1 m transfer, 400 m transfer, and 1 km transfer. Therefore, the images-capture timings of the CHUs can match.

11 Claims, 8 Drawing Sheets

(56) References Cited

FOREIGN PATENT DOCUMENTS

| | | |
|---|---|---|
| JP | 2006-217384 A | 8/2006 |
| JP | 2009-296323 A | 12/2009 |
| JP | 2012-010097 A | 1/2012 |

OTHER PUBLICATIONS

Written Opinion for International Application No. PCT/JP2020/020092, dated Aug. 4, 2020.
International Preliminary Report on Patentability for International Application No. PCT/JP2020/020092, dated Feb. 3, 2022.

* cited by examiner

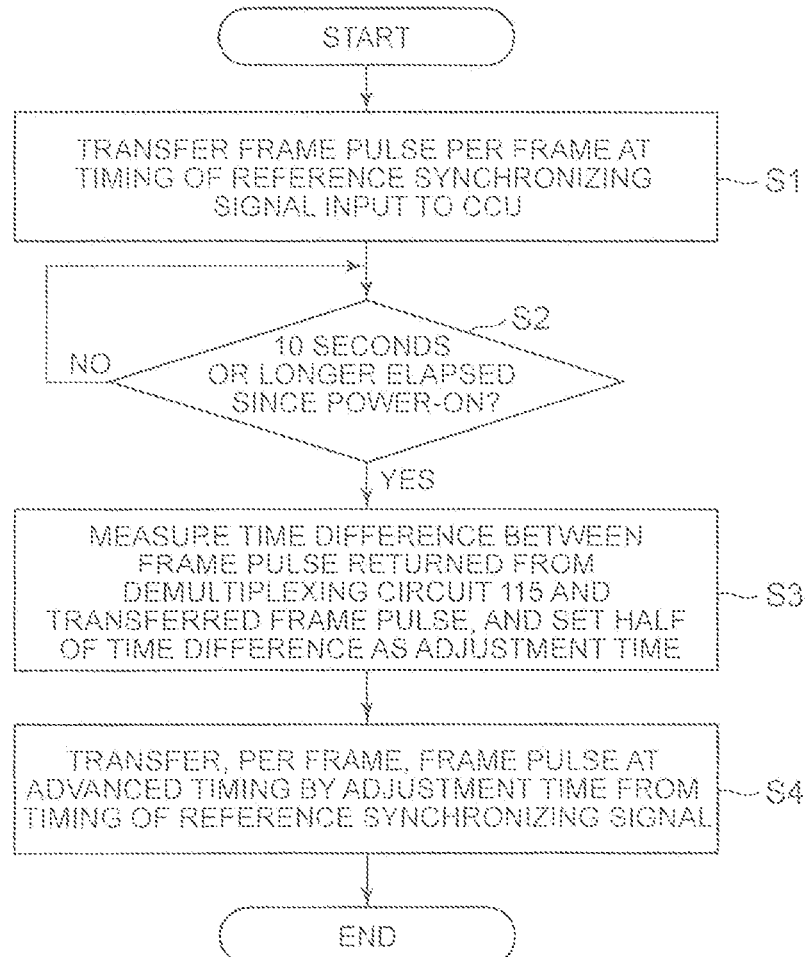

FIG. 4

<FIRST EMBODIMENT, FOR 10 SECONDS FROM START>

■1m TRANSFER

| POINT | UNIT | SIGNAL | TIMING |
|---|---|---|---|
| C1P1K | CCU | INPUT OF REFERENCE SYNCHRONIZING SIGNAL | |
| C1P2K | CCU | SYNCHRONIZING DEMULTIPLEXING TIMING | |
| C1P3K | CCU | TRANSFER SYNCHRONIZING SIGNAL (INITIAL TIME) | |
| C1P4K | CHU | OUTPUT FROM SYNCHRONIZING SIGNAL GENERATION CIRCUIT | |
| C1P5K | CHU | VIDEO SIGNAL FROM CAM | |
| C1P6K | CCU | TRANSFERRED CAM VIDEO | |

■400m TRANSFER

| POINT | UNIT | SIGNAL | TIMING |
|---|---|---|---|
| C2P1K | CCU | INPUT OF REFERENCE SYNCHRONIZING SIGNAL | |
| C2P2K | CCU | SYNCHRONIZING DEMULTIPLEXING TIMING | |
| C2P3K | CCU | TRANSFER SYNCHRONIZING SIGNAL (INITIAL TIME) | |
| C2P4K | CHU | OUTPUT FROM SYNCHRONIZING SIGNAL GENERATION CIRCUIT | |
| C2P5K | CHU | VIDEO SIGNAL FROM CAM | |
| C2P6K | CCU | TRANSFERRED CAM VIDEO | 4μs |

■1km TRANSFER

| POINT | UNIT | SIGNAL | TIMING |
|---|---|---|---|
| C3P1K | CCU | INPUT OF REFERENCE SYNCHRONIZING SIGNAL | |
| C3P2K | CCU | SYNCHRONIZING DEMULTIPLEXING TIMING | |
| C3P3K | CCU | TRANSFER SYNCHRONIZING SIGNAL (INITIAL TIME) | |
| C3P4K | CHU | OUTPUT FROM SYNCHRONIZING SIGNAL GENERATION CIRCUIT | |
| C3P5K | CHU | VIDEO SIGNAL FROM CAM | |
| C3P6K | CCU | TRANSFERRED CAM VIDEO | 10μs |

FIG.5

<FIRST EMBODIMENT, AFTER LAPSE OF 10 SECONDS SINCE START>

■1m TRANSFER

| POINT | UNIT | SIGNAL | TIMING |
|---|---|---|---|
| C1P1K | CCU | INPUT OF REFERENCE SYNCHRONIZING SIGNAL | |
| C1P2K | CCU | SYNCHRONIZING DEMULTIPLEXING TIMING | |
| C1P3K | CCU | TRANSFER SYNCHRONIZING SIGNAL (NORMAL TIME) | |
| C1P4K | CHU | OUTPUT FROM SYNCHRONIZING SIGNAL GENERATION CIRCUIT | |
| C1P5K | CHU | VIDEO SIGNAL FROM CAM | |
| C1P6K | CCU | TRANSFERRED CAM VIDEO | |

■400m TRANSFER

| POINT | UNIT | SIGNAL | TIMING |
|---|---|---|---|
| C2P1K | CCU | INPUT OF REFERENCE SYNCHRONIZING SIGNAL | |
| C2P2K | CCU | SYNCHRONIZING DEMULTIPLEXING TIMING | |
| C2P3K | CCU | TRANSFER SYNCHRONIZING SIGNAL (NORMAL TIME) | 2μs |
| C2P4K | CHU | OUTPUT FROM SYNCHRONIZING SIGNAL GENERATION CIRCUIT | |
| C2P5K | CHU | VIDEO SIGNAL FROM CAM | |
| C2P6K | CCU | TRANSFERRED CAM VIDEO | 2μs |

■1km TRANSFER

| POINT | UNIT | SIGNAL | TIMING |
|---|---|---|---|
| C3P1K | CCU | INPUT OF REFERENCE SYNCHRONIZING SIGNAL | |
| C3P2K | CCU | SYNCHRONIZING DEMULTIPLEXING TIMING | |
| C3P3K | CCU | TRANSFER SYNCHRONIZING SIGNAL (NORMAL TIME) | 5μs |
| C3P4K | CHU | OUTPUT FROM SYNCHRONIZING SIGNAL GENERATION CIRCUIT | |
| C3P5K | CHU | VIDEO SIGNAL FROM CAM | |
| C3P6K | CCU | TRANSFERRED CAM VIDEO | 5μs |

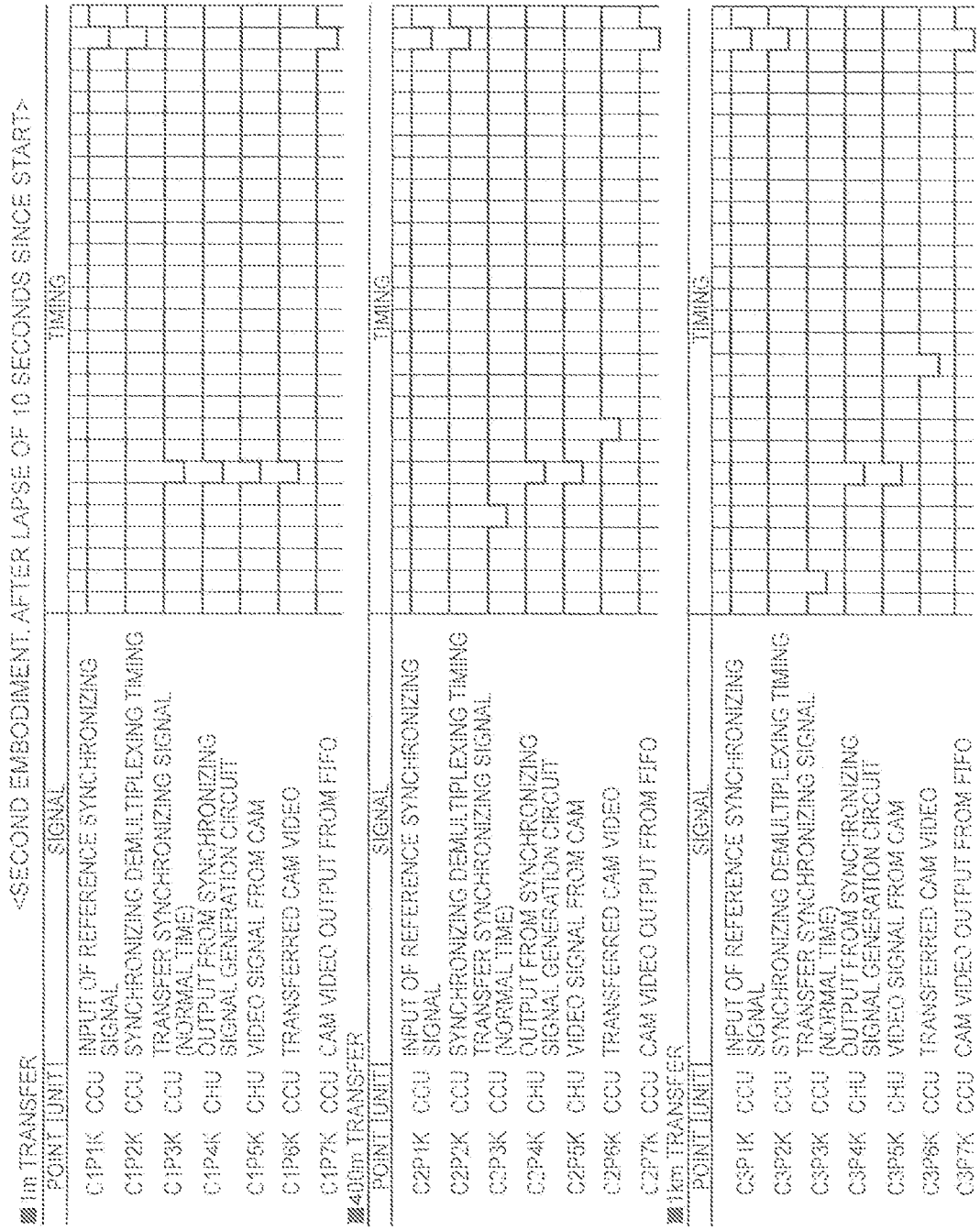

CAMERA-CAPTURED IMAGES TRANSFER DEVICE

CROSS-REFERENCE TO RELATED APPLICATIONS

This application is a national stage application under 35 U.S.C. 371 of PCT Application No. PCT/JP2020/020092 having an international filing date of 21 May 2020, which designated the United States, which PCT application claimed the benefit of Japanese Application No. 2019-135033, filed 23 Jul. 2019, each of which are incorporated herein by reference in their entirety.

TECHNICAL FIELD

The present invention relates to a camera-captured images transfer device and, in particular, to processing of an images-capture timing.

BACKGROUND ART

A camera system is disclosed in Japanese Patent Application Publication No. 2012-10097 A. In the camera system, plural camera sections (hereinafter abbreviated as CHUs), each of which captures a video, and plural camera control units (hereinafter abbreviated as CCUs) are connected on a one-to-one basis via camera cables, and a video signal captured by each of the CHUs is supplied to a video switcher via respective one of the CHUs.

SUMMARY OF INVENTION

Technical Problem

The above camera system has the following problem. Even when timings of the video signals at a time point of being supplied to the video switcher match, a transfer delay time is generated due to a cable length. Thus, the images-capture timing by each of the CHUs varies by a difference in the cable length. Even in the case where optical fiber camera cables are used, a transfer delay difference of approximately 5µ seconds is generated with the difference of 1 km in the cable length, which causes a mismatch of the images-capture timings.

Such a mismatch of several p seconds possibly causes the following problems. For example, in the case where images taken by plural cameras are used to determine whether a hit tennis ball drops on and passes a sideline or drops on the ground outside the sideline in a tennis game, accurate ball tracking calculations may not be performed, and thus the accurate determination may not be made. In addition, in the case where a multiple-perspective video is broadcast in a live baseball game program, a still image is displayed at a timing when a batter swings a bat and hits a ball, and the images by the plural cameras with different viewpoints are sequentially switched. Even in such a situation, if the images-capture timings of the cameras mismatch, an image of a moment when the bat hits the ball, an image of a moment when the ball leaves the bat, and the like are displayed in a non-uniform manner. As a result, the viewpoint cannot be changed smoothly.

In order to solve such a problem, it is considered to uniform all the cable lengths from the camera control unit to the cameras. However, this requires the wasteful cable length.

Such a problem is inherent not only in the video judgement but also in an images-capture system in which the cable length from the camera control unit to each of the cameras varies significantly and such a mismatch cannot be ignored.

The present invention has been made to solve the above problem and therefore provides a camera controller that allows images-capture at a constant timing with respect to an input synchronizing signal even when a length of a camera cable varies.

Solution to Problem

1) A camera-captured images transfer device according to the present invention is a camera-captured images transfer device that includes: a camera section that outputs captured images; and a camera control section that is connected via a cable, in which, when receiving an input synchronizing signal, the camera control section transfers a video frame synchronizing signal based on this input synchronizing signal to the camera section, and in which the camera section outputs, to the camera control section, a video signal that is captured at a timing of the received video frame synchronizing signal. The camera control section includes a phase control section that generates the video frame synchronizing signal on the basis of the input synchronizing signal, changes a phase of the video frame synchronizing signal, and transfers the video frame synchronizing signal to the camera section. The phase control section includes phase adjustment means that measures a delay time by comparing the video frame synchronizing signal transferred to the camera section with the video frame synchronizing signal at the time when the camera control section receives the video signal output from the camera section, sets a half time of the delay time as an adjustment time, and adjusts a phase relationship between the input synchronizing signal and the video frame synchronizing signal to be transferred.

In this way, even in the case where the plural camera sections are connected, images-capture timings of the camera sections can match.

2) In the camera-captured images transfer device according to the present invention, the phase adjustment means advances the phase of the video frame synchronizing signal by the adjustment time from a timing of the input synchronizing signal, and transfers the video frame synchronizing signal. Therefore, even in the case where the plural camera sections are connected, the images-capture timings of the camera sections can match.

3) In the camera-captured images transfer device according to the present invention, the camera control section has a storage section that temporarily stores the video signal received from the camera section. The phase adjustment means advances the phase of the video frame synchronizing signal by a specified time in addition to the adjustment time from the timing of the input synchronizing signal, and transfers the video frame synchronizing signal. The storage section outputs the video signal at a timing of the video frame synchronizing signal that is based on the input synchronizing signal.

Therefore, even in the case where the plural camera sections are connected, the images-capture timings of the camera sections can match. Furthermore, it is possible to absorb a time difference before the video signal is transferred to the camera control section.

4) A camera-captured images transfer device according to the present invention is a camera-captured images transfer device that includes: a camera section that outputs captured images; and a camera control section that is connected via a cable, in which, when receiving an input synchronizing signal, the camera control section transfers a video frame synchronizing signal based on this input synchronizing signal to the camera section, and in which the camera section outputs, to the camera control section, a video signal that is captured at a timing of the received video frame synchronizing signal. The camera control section includes a phase control section that generates the video frame synchronizing signal on the basis of the input synchronizing signal, changes a phase of the video frame synchronizing signal, and transfers the video frame synchronizing signal to the camera section. The phase control section includes transfer delay time determination means that measures a delay time by comparing the video frame synchronizing signal transferred to the camera section with the video frame synchronizing signal at the time when the camera control section receives the video signal output from the camera section, and determines a half time of the delay time as an adjustment time. Accordingly, it is possible to adjust the phase of the video frame synchronizing signal, which is provided to the camera section, by the adjustment time. In this way, even in the case where the plural camera sections are connected, a time difference in the images-capture timing of the video signal, which is caused by a connecting cable length, is not generated.

5) An images-capture system according to the present invention includes the plural camera-captured images transfer devices, and at least two of the cable lengths differ. Therefore, even in the case where the plural camera sections are connected, the images-capture timings of the camera sections can match.

6) A method for matching an images-capture timing according to the present invention is a method for matching an images-capture timing including: connecting a camera section that outputs captured images and a camera control section via a cable; when receiving a video frame synchronizing signal that is based on a received input synchronizing signal, transferring this video frame synchronizing signal to the camera section; and capturing a video at a timing of the video frame synchronizing signal and outputting the video to the camera control section by the camera section. The method for matching an images-capture timing includes: measuring a delay time of the video frame synchronizing signal of the captured images, which is received from the camera section, from the video frame synchronizing signal transferred to the camera section; and determining a half time of this delay time as an adjustment time for adjusting a relationship between the input synchronizing signal and the video frame synchronizing signal to be transferred.

Accordingly, it is possible to eliminate the time difference at an initial timing of response data, which is caused by the length of the cable connecting the camera section and the camera control section. In this way, even in the case where the plural camera sections are connected, the images-capture timings of the camera sections can match.

7) A camera controller according to the present invention is a camera controller that, when receiving an input synchronizing signal, transfers a video frame synchronizing signal based on this input synchronizing signal to a camera section connected via a camera cable, and receives a video signal captured by the camera section at a timing of the video frame synchronizing signal. The camera controller measures a mismatch of a timing between the video frame synchronizing signal transferred to the camera section and the video frame synchronizing signal in the video signal received from the camera section with respect to such a video frame synchronizing signal, advances a phase of the video frame synchronizing signal by a half of the mismatch of the timing, and transfers the video frame synchronizing signal to the camera section. Therefore, even in the case where the plural camera sections are connected to the plural camera controllers, images-capture timings of the camera sections can match.

In the present specification, a reference synchronizing signal (a black burst signal, a tri-level sync signal, or the like) that is input to each of synchronizing demultiplexing circuits 150, 160 of CCUs in the embodiments corresponds to the "input synchronizing signal". A "frame pulse signal" is a binary signal (a digital signal) indicating a position of beginning of each frame in a sequential video signal, and time at which an H level is dropped to an L level corresponds to a timing of the beginning of each of the video frames.

Each of CCUs 211 to 213 in the embodiments corresponds to the "camera controller".

A synchronizing demultiplexing circuit 105 and a phase control circuit 159 in the first embodiment and a synchronizing demultiplexing circuit 160 and a phase control circuit 179 in the second embodiment correspond to the "phase control section".

Features, the other purposes, applications, effects, and the like of the present invention will become apparent with reference to the embodiments and the drawings.

BRIEF DESCRIPTION OF DRAWINGS

FIG. 3 is a flowchart illustrating processing by a phase control circuit 159.

FIG. 4 is a timing chart for 10 seconds from power-on.

FIG. 5 is a timing chart after a lapse of 10 seconds since power-on.

FIG. 7 is a timing chart for 10 seconds from power-on.

FIG. 8 is a timing chart after a lapse of 10 seconds since power-on.

DESCRIPTION OF REFERENCE NUMERALS

100: Camera-captured images transfer device
200: Camera control system

DESCRIPTION OF EMBODIMENTS

1. First Embodiment

Figure 1:
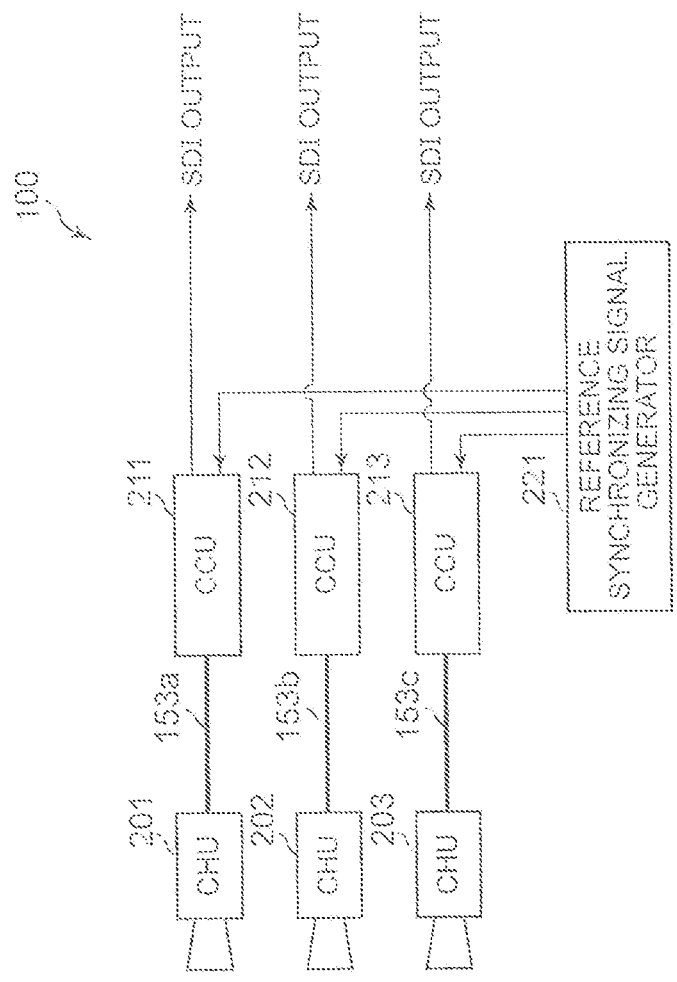
FIG. 1 is a functional block diagram of a camera-captured images transfer device 100.

FIG. 1 illustrates an overview of a camera-captured images transfer device 100 according to the present invention.

The camera-captured images transfer device 100 has: plural cameras (hereinafter abbreviated as CHUs) 201 to 203; and a camera control system 200 that has a delay adjustment images-capture function to adjust images-capture timings of the CHUs 201 to 203.

The camera control system 200 includes a reference synchronizing signal generator 221 and plural camera control units (hereinafter abbreviated as CCUs) 211 to 213. The CCUs 211 to 213 are respectively connected to the CHUs 201 to 203 by single-mode optical fibers 153a to c. Each of the CCUs 211 to 213 outputs images-capture data in an SDI standard.

Figure 2:
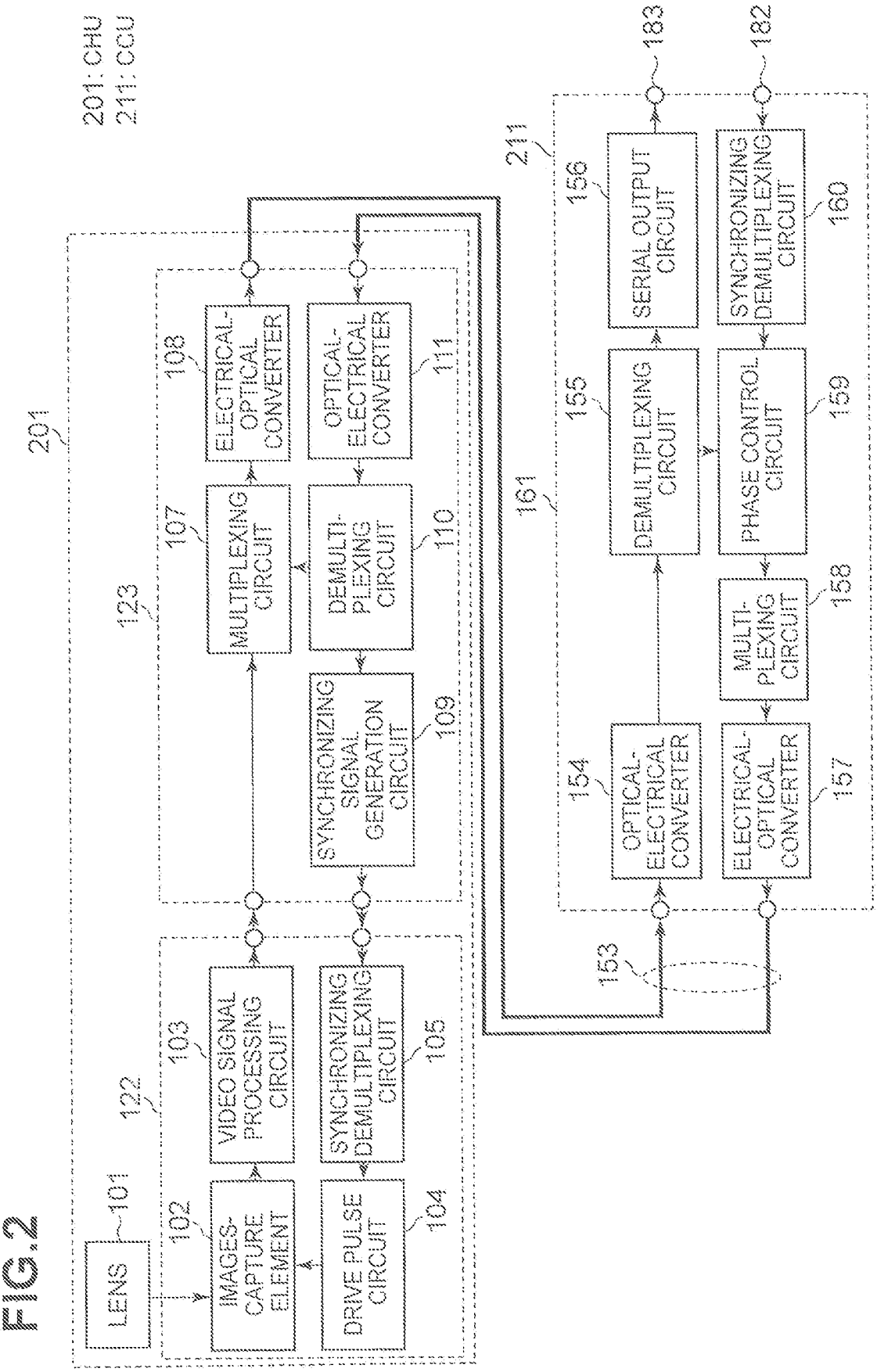
FIG. 2 illustrates hardware configurations of a CCU and a CHU in a first embodiment.

FIG. 2 illustrates hardware configurations of the CHU 201 and the CCU 211 in FIG. 1. Since the hardware configuration of the CHU 201 is the same as the conventional art, a brief description thereon will be made.

The CHU 201 includes an optical-electrical converter 111, a demultiplexing circuit 110, a multiplexing circuit 107, a synchronizing signal generation circuit 109, a synchronizing demultiplexing circuit 105, a drive pulse generation circuit 104, a CMOS images-capture element 102, a video signal processing circuit 103, and an electrical-optical converter 108.

The CCU 211 transfers, to the optical-electrical converter 111, a multiplexed optical signal that includes a clock signal and a frame pulse signal. The optical-electrical converter 111 converts this optical signal into an electric signal by a photodiode. The demultiplexing circuit 110 demultiplexes the electric signal in a serial state into the clock signal and the frame pulse signal, outputs the demultiplexed frame pulse signal to the multiplexing circuit 107, and outputs the demultiplexed clock signal and frame pulse signal to the synchronizing signal generation circuit 109. The synchronizing signal generation circuit 109 generates a tri-level sync signal from the received frame pulse signal and clock signal, and outputs the tri-level sync signal to the synchronizing demultiplexing circuit 105.

The synchronizing demultiplexing circuit 105 generates a horizontal synchronizing signal and a vertical synchronizing signal from the received analog tri-level sync signal.

The drive pulse generation circuit 104 generates an images-capture element drive pulse from the horizontal synchronizing signal and the vertical synchronizing signal that are output from the synchronizing demultiplexing circuit 105.

Light that passes through a lens 101 forms an image on an images-capture element surface of the CMOS images-capture element 102. The CMOS images-capture element 102 receives an images-capture element drive pulse to capture a video image with 1920 effective horizontal pixels and 1080 effective vertical pixels and at a frame rate of 59.94 fps, and outputs an RGB digital video signal. The video signal processing circuit 103 executes gamma processing and matrix processing on the RGB digital video signal, which is output from the CMOS images-capture element 102, and outputs a video signal that includes a luminance signal and a color-difference signal.

The multiplexing circuit 107 multiplexes the luminance signal and the color-difference signal, which are output from the video signal processing circuit 103, and the frame pulse signal, which is demultiplexed by the demultiplexing circuit 110, and converts the multiplexed signal into a serial signal. The electrical-optical converter 108 converts this serial signal into the optical signal by a laser diode and transfers the optical signal to the CCU 211.

As described above, when the CHU receives the optical signal that includes the clock signal and the frame pulse signal from the CCU 211, the CHU 201 outputs captured video data to the CCU 211.

FIG. 2 separately illustrates the sections in the CHU 201 into an images-capture unit 122 and a control unit 123. However, the present invention is not limited thereto. Configurations of the other CHUs 202, 203 are the same as that of the CHU 201.

Here, in the case where lengths of optical cables between the CCUs and the CHUs differ, the images-capture timings mismatch by a difference in the optical cable length even with simultaneous provision of the optical signals including the frame pulse signal from the CCUs. To handle such a problem, in this embodiment, a phase control circuit 159 is provided to each of the CCUs, so as to match the images-capture timings. A description thereon will be made below.

The CCU 211 has a synchronizing demultiplexing circuit 160, the phase control circuit 159, a multiplexing circuit 158, an electrical-optical converter 157, an optical-electrical converter 154, a demultiplexing circuit 155, a serial output circuit 156, an output terminal 123, and a reference synchronizing signal input terminal 122.

The synchronizing demultiplexing circuit 160 receives an analog tri-level sync signal as a reference synchronizing signal from the reference synchronizing signal generator 221 (see FIG. 1). When the synchronizing signal circuit 160 receives this tri-level sync signal, the synchronizing demultiplexing circuit 160 detects the horizontal synchronizing signal and the vertical synchronizing signal from the tri-level sync signal, generates a video sampling clock signal and the frame pulse signal that indicates a time position of beginning of a video frame, and outputs the video sampling clock signal and the frame pulse signal to the phase control circuit 159.

When the phase control circuit 159 receives the horizontal synchronizing signal, the vertical synchronizing signal, and the frame pulse signal from the synchronizing demultiplexing circuit 160, as will be described below, the phase control circuit 159 advances a timing of the frame pulse signal by an amount of mismatching prevention data, and then outputs the video sampling clock signal and the frame pulse signal.

The multiplexing circuit 158 multiplexes a signal that includes the video sampling clock signal and the frame pulse signal output from the phase control circuit 159, further serializes this multiplexed signal, and outputs an electric signal. The electrical-optical converter 157 converts the electric signal output from the multiplexing circuit 158 into the optical signal by a laser diode, and provides the optical signal to the CHU 201.

As it has already been described, the CCU 211 receives, from the CHU 201, the luminance signal and the color-difference signal as the video signal as well as the video data in which the frame pulse signal and the video sampling clock as control signals are serialized.

The optical-electrical converter 154 converts the received optical signal into an electric signal by a photodiode. The demultiplexing circuit 155 demultiplexes the electric signal in the serial state into the video signal, which includes the luminance signal and the color-difference signal, and into the frame pulse signal, and outputs the video signal and the frame pulse signal separately. The serial output circuit 156 serializes the video signal including the luminance signal and the color-difference signal, and outputs an SDI signal in the SMPTE 425M standard to the outside.

The frame pulse signal that is demultiplexed by the demultiplexing circuit 155 is provided to the phase control circuit 159. The phase control circuit 159 measures a time difference between the frame pulse signal from the demultiplexing circuit 155 and the frame pulse signal transferred to the multiplexing circuit 158, determines a half of this time difference as an adjustment time, and thereafter outputs the frame pulse signal at an advanced timing by the adjustment time.

In this embodiment, for 10 seconds from power-on, the frame pulse signal is output at the timings of the horizontal synchronizing signal and the vertical synchronizing signal, which are provided from the synchronizing demultiplexing circuit 160. Then, after a lapse of 10 seconds since the power-on, the adjustment time is determined, and the frame pulse signal is output at the timing that is advanced by the adjustment time.

FIG. 3 illustrates a flowchart of the above processing. More specifically, in a period from the power-on to the lapse of 10 seconds, the phase control circuit 159 outputs the input frame pulse signal, which is received from the synchronizing demultiplexing circuit 160, as is to the multiplexing circuit 158 (step S1).

Then, after the lapse of 10 seconds since the power-on, the phase control circuit 159 measures a delay time from the time difference between the frame pulse signal output from the demultiplexing circuit 155 and the frame pulse signal output from the synchronizing demultiplexing circuit 160, and calculates the adjustment time that is the half of the delay time (step S3). In addition, the phase control circuit 159 outputs, to the multiplexing circuit 158, the frame pulse signal, the phase of which is advanced by the adjustment time retained for the frame pulse signal output from the synchronizing demultiplexing circuit 160 (step S4).

A description will be made on adjustment of the delay with reference to FIG. 4 and FIG. 5. A description will hereinafter be made on a case where the lengths of the optical cables from the CCUs to the CHUs are 1 m, 400 m, and 1 km as an example. In FIG. 4, a point C1P1K is an input point to the synchronizing demultiplexing circuit 160, a point C1P2K is an output point from the synchronizing demultiplexing circuit 160, a point C1P3K is an output point from the phase control circuit 159, a point C1P4K is an input point to the CHU, a point C1P5K is an output point from the CHU, and a point C1P6K is an input point to the CCU. In FIG. 4, in the case where the cable length is 1 m, a mismatch that becomes a problem does not occur at the points C1P1K to C1P6K. Here, in the case where the cable length is 1 m, the delay of approximately $\frac{1}{200}$ μs occurs in calculation. However, since the delay of such an extent is not problematic, it is handled that the mismatch does not occur.

On the contrary, in the case where the cable length is 400 m, the delay of 2 μs from the input timing of the synchronizing signal to the CCU occurs at the points C1P4K and C1P5K, and the delay of 4 μs from the input timing of the synchronizing signal to the CCU occurs at the point C1P6K.

Meanwhile, in the case where the cable length is 1 km, the delay of 5 μs from the input timing of the synchronizing signal to the CCU occurs at the points C1P4K and C1P5K, and the delay of 10 μs from the input timing of the synchronizing signal to the CCU occurs at the point C1P6K.

Such delays occur by the optical cable length from each of the CCUs to respective one of the CHUs. In this embodiment, in order to match the images-capture timings of the CHUs, a time from the input timing of the synchronizing signal to each of the CCUs to a timing at which each of the CCUs receives the signal from respective one of the CHUs is calculated. Then, the phase control circuit 159 advances the output timing of the frame pulse signal by a half of this time. More specifically, as illustrated in FIG. 5, the output timing (the point C1P3K) from the phase control circuit 159 is advanced by 2 μs when the cable length is 400 m, and is advanced by 5 μs when the cable length is 1 km. As a result, the timings at the point C1P4K and C1P5K match regardless of the cable length.

Here, in FIGS. 4 and 5, in order to simplify the explanation, it is assumed that a processing delay in each of the sections is set to zero.

As described above, in this embodiment, the phase control circuit in each of the CCUs transfers, to respective one of the CHUs, the frame pulse signal, the phase of which is advanced by the mismatching prevention data from the time position of the beginning of the frame of the reference synchronizing signal (the tri-level sync signal or a black burst signal) received by each of the CCUs. Accordingly, the frame pulse signal, the phase of which is advanced by the mismatching prevention data from that in the reference synchronizing signal received from the reference synchronizing signal generator is transferred to the CHU. In this way, the timings of the beginning of the frames of the synchronizing signals, which are output from the synchronizing signal generation circuits in the CHUs, match. As a result, the images-capture timings match.

2. Second Embodiment

In the above first embodiment, as apparent from the timing chart in FIG. 5, the images-capture timings of the CHUs can match regardless of the cable length between each of the CCUs and respective one of the CHUs. However, even in such a case, output timings from the CCUs to an image synchronizing computer 230 mismatch by the delay that occurs due to the optical cables from the CHUs to the CUUs (the delay at the point C1P6K in FIG. 5).

Such a delay can be eliminated by the conventional genlock function. However, by adopting a configuration as in a second embodiment, it is possible to eliminate the delay at the point C1P6K in FIG. 5.

Figure 6:
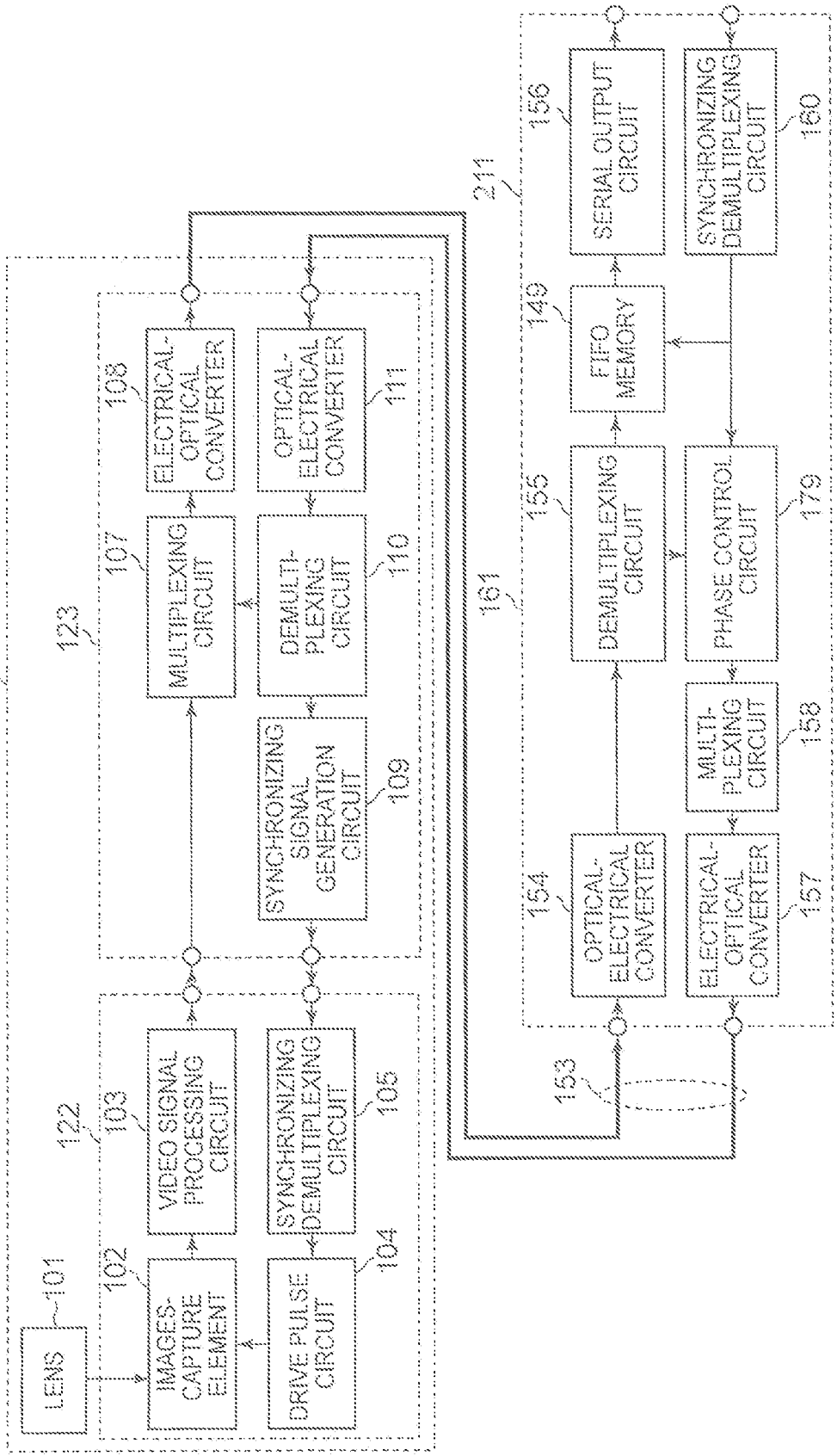
FIG. 6 illustrates hardware configurations of a CCU and a CHU in a second embodiment.

As a hardware configuration, as illustrated in FIG. 6, FIFO (First In, First Out) memory 149 is provided between the serial output circuit 156, which outputs the signal from the CCU 211 to the image synchronizing computer 230, and the demultiplexing circuit 155. Similar to the first embodiment, it is configured that a phase control circuit 179 outputs the frame pulse signal at an earlier timing by a sum of the mismatching prevention data and a specified time (for example, 20 μs) than the frame pulse signal received from the synchronizing demultiplexing circuit 160.

As processing in the phase control circuit 179, the frame pulse signal only needs to be transferred at the further advanced timing by 20 μs in either step S1 or step S4 of FIG. 3.

More specifically, in the period from the power-on and before the lapse of 10 seconds, the phase control circuit 179 advances the phase of the frame pulse signal, which is received from the synchronizing demultiplexing circuit 160, by 20 μs, and outputs the frame pulse signal to the multiplexing circuit 158. Then, after the lapse of 10 seconds since the power-on, the phase control circuit 179 measures the delay time from the time difference between the frame pulse signal output from the demultiplexing circuit 155 and the frame pulse signal output from the synchronizing demultiplexing circuit 160, and calculates the adjustment time that is the half of the delay time. In addition, the phase control circuit 179 outputs, to the multiplexing circuit 158, the frame pulse signal, the phase of which is advanced by the adjustment time, which is retained for the frame pulse signal output from the synchronizing demultiplexing circuit 160, +20 μs.

As described above, the frame pulse signal, which controls the CHU, is output by advancing the timing by a time which is obtained by adding the specified time to the mismatching prevention data. In this way, even in the case where the delay based on the cable length between the CCU and the CHU occurs, the timings of the beginning of the frames of the synchronizing signals, which are output from the synchronizing signal generation circuits 109 in the CHUs, match. Therefore, the images-capture timings of the plural CHUs match.

In addition, the video signals from the plural CHUs are captured at the advanced timing by the specified time. In the case where each of such a video signal is written in the FIFO memory 149 and is read from the FIFO memory 149 at the timing of the frame pulse signal output from the synchronizing demultiplexing circuit 160, output timings of the video signals from the plural CCUs can match.

The specified time is set to 20 µs. This specified time is set to secure a margin for the mismatching prevention data of the CCU that receives the video signal from the CHU at the latest timing among the plural CCUs. However, the specified time is not limited thereto.

A description will be made on the FIFO memory 149. The FIFO memory 149 is controlled by a write address reset pulse and a read address reset pulse. For the write address reset pulse, information indicating the beginning of the frame, which is demultiplexed by the demultiplexing circuit 155, is used. For the read address reset pulse, the frame pulse signal output from the synchronizing demultiplexing circuit 160 is used.

Figure 7:
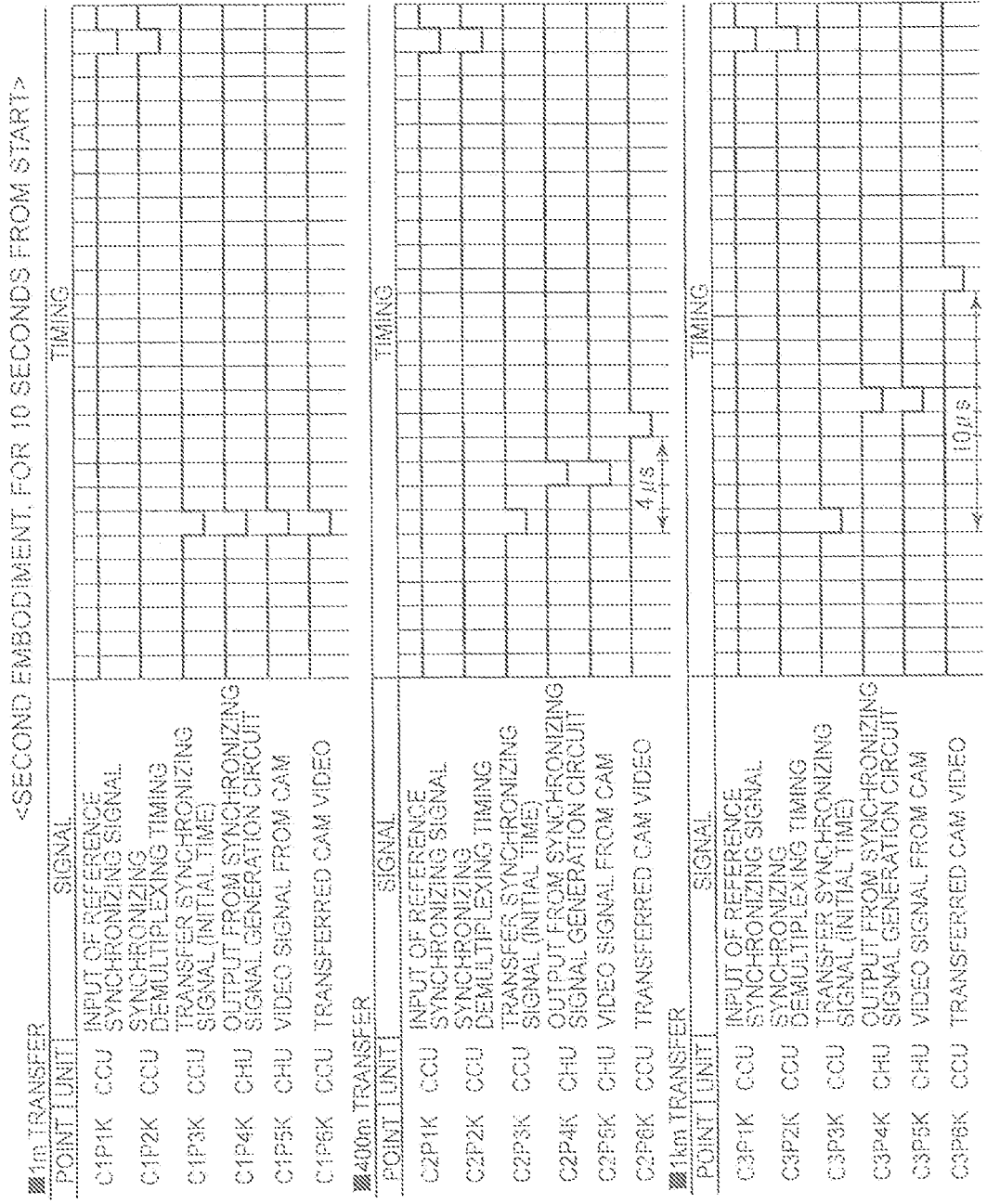

A description will be made on a timing chart in this embodiment with reference to FIGS. 7, 8. Points in FIGS. 7, 8 are the same as those in FIGS. 4, 5.

FIG. 8 is a timing chart for 10 seconds from the power-on. The frame pulse signal, the phase of which is advanced by 20 µs from the input frame pulse signal, is output to the multiplexing circuit 158. In this state, similar to the first embodiment, the images-capture timings of the CHUs mismatch. On the contrary, after the lapse of 10 seconds since the power-on, as illustrated in FIG. 9, similar to the first embodiment, the frame pulse signal is further advanced by the half of the time from the output timing from the CCU to the received timing, and is transferred to the multiplexing circuit 158. In this way, the mismatch of the images-capture timings of the CHUs is eliminated. In addition, the phase of the frame pulse signal is advanced by 20 µs from the input frame pulse signal, and the read timing from the FIFO memory 149 is made to match the timing of the synchronizing signal input to the phase control circuit 179. In this way, it is possible to absorb the delay that is based on a returning distance from the CHU to the CCU.

More specifically, the FIFO memory 149 writes the video signal that is output from the demultiplexing circuit 155, reads the video signal, and outputs the video signal to the serial output circuit 156. A write address is controlled at the synchronizing timing (the timing of the frame pulse signal indicating the beginning of the frame) of the video signal output from the demultiplexing circuit 155. Then, a read address is controlled at the timing of the frame pulse signal output from the synchronizing demultiplexing circuit 160. As a result, the video signal is delayed by the time difference between the frame pulses signal on both sides, and is output.

3. Another Embodiment

In this embodiment, the delay is not adjusted until the lapse of 10 seconds since the power-on. Thereafter, the delay is adjusted for each time. However, the above time is not limited to 10 seconds.

The delay based on the cable length is measured each time. However, once the delay adjustment time is set, the calculation may not be performed thereafter, and the delay may be adjusted by using such data.

The above embodiment can be implemented as a device that determines the delay adjustment data in order to match the images-capture timings of the CHUs according to the difference in the cable length.

In the above embodiment, the description has been made on the case of use for the video judgement. However, the application is not limited thereto. For example, the problem of synchronizing the images-capture timings of the plural cameras occurs similarly in the case of synchronizing 3-dimensional images from video data of the plural cameras. Thus, the present invention can be applied to such a case similarly.

In the above embodiment, the description has been made on the case where the optical fibers are used as the connection cables between the camera control units and the cameras. However, any cable can be adopted as long as the cable can perform high-speed transfer, can be used for a long distance, and can be installed separately. For example, a triax cable or the like may be adopted.

In the second embodiment, the specified time is fixed. However, the mismatch prevention data of the CCU that receives the video signal from the CHU at the latest timing among the plural CCUs may be measured, and the measured data or data further added with the margin may be set as the specified time.

In the above description, the present invention has been described as the preferred embodiments. However, the present invention is not used for a restrictive purpose but used for the description. The present invention can be modified within the scope of the claims without departing from the scope and the spirit of the present invention.

The invention claimed is:

1. A camera controller having a camera control section that, when receiving an input synchronizing signal, transfers a video frame synchronizing signal that is based on this input synchronizing signal to a camera section connected via a camera cable, and outputs a video signal, which is received from the camera section, for the video frame synchronizing signal, wherein
   the camera control section measures a mismatch of a timing between the video frame synchronizing signal transferred to the camera section and the video frame synchronizing signal in the video signal that is received from the camera controller with respect to such a video frame synchronizing signal, advances a phase of the video frame synchronizing signal by a half of the mismatch of the timing, and determines a mismatch adjustment time for transferring the video frame synchronizing signal to the camera section.

2. The camera controller according to claim 1, wherein the phase control section adjusts a phase relationship between the input synchronizing signal and the video frame synchronizing signal to be transferred by the determined adjustment time.

3. The camera controller according to claim 2, wherein the phase control section advances the phase of the video frame synchronizing signal by a specified time in addition to the adjustment time from a timing of the input synchronizing signal, and transfers the video frame synchronizing signal.

4. A camera-captured images transfer device including: the camera controller according to claim 1; and
   a camera section that is connected to the camera control section via a cable and outputs captured images, and
   in which, when receiving an input synchronizing signal, the camera control section transfers, to the camera section, a video frame synchronizing signal that is based on this input synchronizing signal, and transfers, to the camera control section, a video signal captured at a timing of the video frame synchronizing signal received by the camera section, wherein the camera control section includes a phase control section that generates the video frame synchronizing signal on the basis of the input synchronizing signal, changes a phase of the video frame synchronizing signal, and transfers the video frame synchronizing signal to the camera section, and the phase control section measures a delay time by comparing the video frame synchronizing signal transferred to the camera section with the video frame synchronizing signal at the time when the camera control section receives camera-captured images output from the camera section, and determines a half time of the delay time as an adjustment time.

5. The camera-captured images transfer device according to claim 4, wherein the phase control section adjusts a phase relationship between the input synchronizing signal and the video frame synchronizing signal to be transferred by the determined adjustment time.

6. The camera-captured images transfer device according to claim 5, wherein the phase control section advances the phase of the video frame synchronizing signal by the adjustment time from a timing of the input synchronizing signal, and then transfers the video frame synchronizing signal.

7. The camera-captured images transfer device according to claim 5, wherein the phase control section advances the phase of the video frame synchronizing signal by the adjustment time from a timing of the input synchronizing signal, and then transfers the video frame synchronizing signal.

8. The camera-captured images transfer device according to claim 7, wherein the phase control section advances the phase of the video frame synchronizing signal by the adjustment time from a timing of the input synchronizing signal, and then transfers the video frame synchronizing signal.

9. The camera-captured images transfer device according to claim 4, wherein the camera control section has a storage section that temporarily stores the video signal received from the camera section, the phase control section advances the phase of the video frame synchronizing signal by a specified time in addition to the adjustment time from a timing of the input synchronizing signal, and transfers the video frame synchronizing signal, and the storage section outputs the video signal at a timing of the video frame synchronizing signal based on the input synchronizing signal.

10. An images-capture system comprising: the plural camera-captured images transfer devices according to claim 4, wherein lengths of at least two of the cables differ.

11. A method for matching an images-capture timing including: connecting a camera section that outputs captured images and a camera control section via a cable; when receiving an input synchronizing signal, transferring, to the camera section, a video frame synchronizing signal that is based on the received input synchronizing signal; and capturing images at a timing of the video frame synchronizing signal and outputting the video to the camera control section by the camera section, the method for matching the images-capture timing comprising:

measuring a delay time of the video frame synchronizing signal of the captured images, which is received from the camera section, from the video frame synchronizing signal transferred to the camera section; and determining a half time of this delay time as an adjustment time for adjusting a relationship between the input synchronizing signal and the video frame synchronizing signal to be transferred.

* * * * *